March 10, 1959 A. V. LOUGHREN 2,877,293

COLOR-BALANCE CONTROL SYSTEM

Filed June 17, 1954

United States Patent Office 2,877,293

Patented Mar. 10, 1959

2,877,293

COLOR-BALANCE CONTROL SYSTEM

Arthur V. Loughren, Great Neck, N. Y., assignor to Hazeltine Research, Inc., Chicago, Ill., a corporation of Illinois Application June 17, 1954, Serial No. 437,470

7 Claims. (Cl. 178—5.4)

Figure 1:
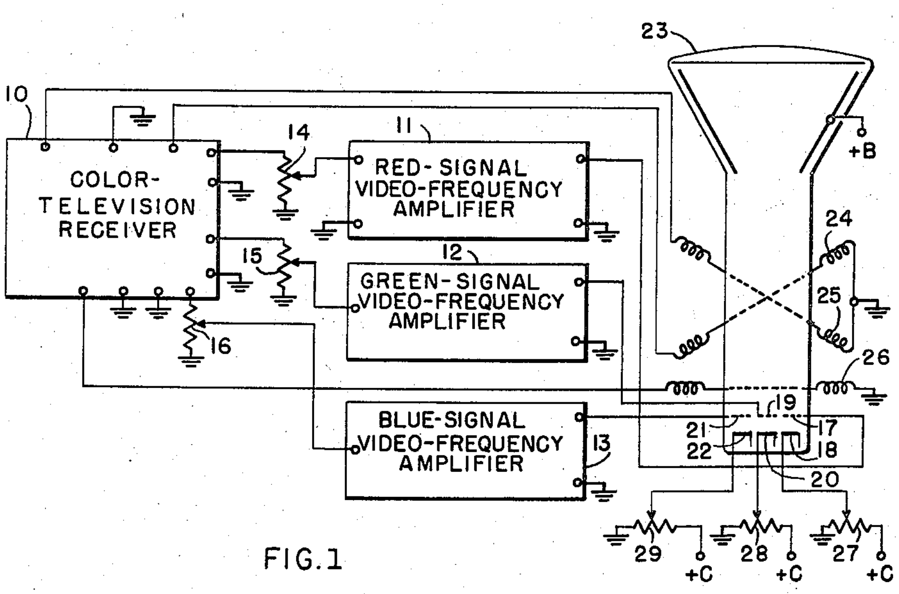

This invention relates to color-balance control systems for color-image-reproducing apparatus.

In color-television receivers, especially those of the type which employs a cathode-ray display device having three independent electron guns, it has heretofore been difficult, particularly for an unskilled operator, to adjust three color channels of the receiver to provide color balance, demonstrated, for example, by producing an acceptable shade of white in the highlights or an acceptable neutral dark gray in the shadows of a picture having white and gray regions. To reproduce a picture accurately it is necessary that the color balance of the receiver be correct, that is, the color-signal amplitudes applied to the electron guns of the cathode-ray tube and the reference level biases applied thereto must have relative values such that the color components developed on the display screen combine to provide picture regions of proper hue and saturation. If the color balance is incorrect, the white and gray regions of the reproduced image appear colored while the colored regions have incorrect hue or saturation.

It has heretofore been necessary in color-television receivers of the type described to adjust three voltage dividers for each of one or more functions to obtain color balance. It will be apparent that these numerous controls present a difficult adjustment problem to the unskilled operator who may desire to adjust the color balance of his receiver from time to time.

It is an object of the invention to provide a new and improved color-balance control system for color-image-reproducing apparatus which facilitates adjustment of the color balance.

It is another object of the invention to provide a new and improved color-balance control system for color-image-reproducing apparatus in which a minimum number of control handles require adjustment by an operator to provide color balance.

In accordance with a particular form of the invention, in color-image-reproducing apparatus, a control system for adjusting the color balance of a reproduced composite multicolor image comprises means for determining a first signal amplitude affecting the intensities of the colors reproduced by the apparatus. The control system includes two-dimensional control means for adjusting a second signal amplitude affecting the relative intensities in response to adjustment in one dimension and for adjusting a third signal amplitude affecting the relative intensities in response to adjustment in the other dimension, whereby color-balance control is facilitated.

For a better understanding of the present invention, together with other and further objects thereof, reference is had to the following description taken in connection with the accompanying drawing, and its scope will be pointed out in the appended claims.

Figure 2:
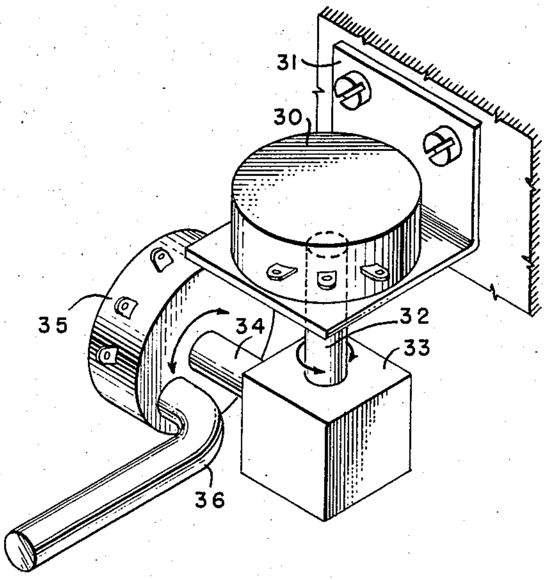

Referring to the drawing:

Fig. 1 is a circuit diagram, partly schematic, of a color-television receiver including a color-balance control system constructed in accordance with the invention, and Fig. 2 is a perspective view of a portion of the Fig. 1 color-balance control system.

Referring now more particularly to Fig. 1 of the drawing, there is represented a color-television receiver 10 of conventional construction with the exception of the color-balance control system thereof. Various circuits associated with the color-image-reproducing apparatus of the receiver 10 are represented as coupled to the receiver, but it will be understood that these circuits also are an integral part of the receiver.

There are coupled to three video-frequency output circuits of the receiver 10 three color-signal channels comprising, for example, red, green, and blue signal video-frequency amplifiers 11, 12, and 13. The amplifiers 11, 12, and 13 preferably have input circuits including adjustable voltage dividers 14, 15, and 16, more fully described hereinafter, for adjusting the color-signal amplitudes applied to the amplifiers 11, 12, and 13, respectively. The output circuits of the amplifiers 11, 12, and 13 preferably are individually coupled to three electron guns including control electrode-cathode structures 17, 18; 19, 20; 21, 22 and other conventional electrodes (not shown) of a cathode-ray tube 23 which may be, for example, of the shadow-mask type. Line-scan and field-scan deflection windings 24, 25 and focus winding 26 of conventional construction associated with the cathode-ray tube 23 are energized by conventional circuits of the color-television receiver 10. The cathodes 18, 20, 22 are connected to adjustable voltage dividers 27, 28, 29 which supply adjustable operating biases to the electron guns to control the background or shadow levels of the colors individually developed thereby on the display screen of the tube 23.

Means for determining, for example, the red color-signal amplitude which primarily controls the red highlights reproduced by the cathode-ray tube comprises the adjustable voltage divider 14 controlling the effective gain of the red color-signal channel. Means for determining the reference level which primarily controls, for example, the red shadows or background intensity reproduced by the apparatus comprises the voltage divider 27. Recognizing that proper color balance may be provided on a relative basis, voltage dividers 14 and 27 may be preset so that, for practical purposes, they may be eliminated from the group which the unskilled operator controls. Accordingly, color balance for the picture highlights or picture shadows may be accomplished by a control adjustable in two dimensions for adjusting preferably at least one of the color signal amplitude and reference level which jointly control the intensity of a second color reproduced by the apparatus in response to adjustment in one dimension and for adjusting preferably at least one of the color signal amplitude and reference level which jointly control the intensity of a third color in response to adjustment in the other dimension.

Referring now more particularly to Fig. 2 of the drawing, a housing 30 for the adjustable voltage divider 28 is attached to the chassis of the apparatus by means of a suitable bracket 31. A rotatable shaft 32 controlling the position of the movable arm of the voltage divider is rigidly attached to a metallic block 33 to which there is also attached a shaft 34 which rotates within a housing 35 containing the adjustable voltage divider 29 of Fig. 1. A control handle 36 adjustable in two dimensions is attached to the housing 35 for adjusting the voltage dividers 28, 29. Displacement of the handle 36 in a plane perpendicular to the shaft 34 adjusts the voltage divider 29 and, thus, the intensity of the blue background level with respect to the preset red background level. Similarly, displacement of the handle 36 in a plane perpendicular to the shaft 32 adjusts the voltage divider 28 and, thus, the intensity of the green background level with respect to the red background level to provide color balance of the background or shadows. The handle 36 may, if desired, be moved directly to a given position from any other position simultaneously adjusting two voltage dividers.

It will be understood that the voltage dividers 15 and 16 of the Fig. 1 receiver may be housed and connected to each other in a similar manner and controlled by a two-dimensional control handle similar to the handle 36. The color balance of the picture highlights may be controlled in a similar manner by means of the second control handle. Accordingly, for purposes of simplicity, the Fig. 2 view is not repeated but may be considered to represent the housings and mechanical connections for the voltage dividers 15, 16.

From the foregoing description, it will be seen that adjustment of a first control handle to control the color-balance background and of a second control handle to control the color balance of the highlights of the reproduced picture reduces to two controls accessible to the operator all the adjustments required for obtaining proper color balance of both the high lights and the background level of the picture to be reproduced.

While there has been described what is at present considered to be the preferred embodiment of this invention, it will be obvious to those skilled in the art that various changes and modifications may be made therein without departing from the invention, and it is, therefore, aimed to cover all such changes and modifications as fall within the true spirit and scope of the invention.

What is claimed is:

1. In color-image-reproducing apparatus, a control system for adjusting the color balance of a reproduced composite multicolor image comprising: a first color-signal channel having a gain which determines the amplitude of a first color signal and the intensity of the highlights of a first color reproduced by the apparatus; and second and third color-signal channels including a control handle adjustable in two dimensions for adjusting the gain of the second channel to control the second color-signal amplitude and the intensity of the highlights of the second color reproduced by the apparatus in response to adjustment in one dimension and for adjusting the gain of the third channel to control the third color-signal amplitude and the intensity of the highlights of the third color signal reproduced by the apparatus in response to adjustment in the other dimension, whereby color-balance control of the picture highlights is facilitated.

2. In color-image-reproducing apparatus, a control system for adjusting the color balance of a reproduced composite multicolor image comprising: a first color-signal channel including an adjustable reference voltage-supply circuit for controlling the intensity of the background of a first color reproduced by the apparatus; and second and third color-signal channels including second and third adjustable reference voltage-supply circuits and a control handle therefor adjustable in two dimensions for adjusting the second reference voltage to control the intensity of the background of a second color reproduced by the apparatus in response to the adjustment in one dimension and for adjusting the third voltage level to control the intensity of the background of a third color reproduced by the apparatus in response to adjustment in the other dimension, whereby color-balance control of the picture background is facilitated.

3. In color-image-reproducing apparatus, a control system for adjusting the color balance of a reproduced composite multicolor image comprising: means for determining a first signal amplitude affecting the intensities of one or more colors reproduced by the apparatus; and a control adjustable in two dimensions for adjusting a second signal amplitude affecting one or more intensities in response to adjustment in one dimension and for adjusting a third signal amplitude affecting one or more intensities in response to adjustment in the other dimension, whereby color-balance control is facilitated.

4. In color-image-reproducing apparatus, a control system for adjusting the color balance of a reproduced composite multicolor image comprising: means for determining at least one of the color-signal amplitude and reference level jointly controlling the intensity of a first color reproduced by the apparatus; and a control adjustable in two dimensions for adjusting at least one of the color-signal amplitude and reference level jointly controlling the intensity of a second color reproduced by the apparatus in response to adjustment in one dimension and for adjusting at least one of the color-signal amplitude and reference level jointly controlling the intensity of a third color reproduced by the apparatus in response to adjustment in the other dimension, whereby color-balance control is facilitated.

5. In color-image-reproducing apparatus, a control system for adjusting the color balance of a reproduced composite multicolor image comprising: means for determining at least one of the color-signal amplitude and reference level jointly controlling the intensity of a first color reproduced by the apparatus; and control means including an adjustable voltage divider and a control handle attached thereto and adjustable in two dimensions for adjusting at least one of the color-signal amplitude and reference level jointly controlling the intensity of a second color reproduced by the apparatus in response to adjustment in one dimension, said control means also including a second voltage divider attached to said first voltage divider for adjusting at least one of the color-signal amplitude and reference level jointly controlling the intensity of a third color reproduced by the apparatus in response to adjustment in the other dimension, whereby color-balance control is facilitated.

6. In color-image-reproducing apparatus, a control system for adjusting the color balance of a reproduced composite multicolor image comprising: cathode-ray image-reproducing apparatus having a display screen and three electron guns for developing electron beams which individually reproduce red, green, and blue images on the display screen to develop a composite multicolor image; a first adjustable bias-supply circuit coupled to a first electron gun for providing a reference level which controls the background level of a first of the colors; a color-signal channel having an adjustable gain and coupled to said first electron gun for controlling the intensity of the said first color reproduced by the apparatus; second and third adjustable bias-supply circuits individually coupled to the second and third electron guns for providing reference levels which individually control the background levels of second and third reproduced colors; and second and third color-signal channels including a control handle adjustable in two dimensions for adjusting the gain of said second channel to control the intensity of the second color reproduced by the apparatus in response to adjustment in one dimension and for controlling the gain of said third channel to control the intensity of the third color reproduced by the apparatus in response to adjustment in the other dimension, whereby color-balance control is facilitated.

7. In color-image-reproducing apparatus, a control system for adjusting the color balance of a reproduced composite multicolor image comprising: cathode-ray image-reproducing apparatus having a display screen and three electron guns for developing electron beams which individually reproduce red, green, and blue images on the display screen to develop a composite tricolor image; a first adjustable bias-supply circuit coupled to a first electron gun for providing a reference level which controls the background level of a first of the colors; a color-signal channel having an adjustable gain and coupled to said first electron gun for controlling the intensity of the said first color reproduced by the apparatus; second and third adjustable bias-supply circuits including a control handle adjustable in two dimensions for adjusting the bias supplied to a second electron gun to control the background level of a second color reproduced by the apparatus in response to adjustment in one dimension and for adjusting the bias supplied to the third electron gun to control the background level of the third color reproduced by the apparatus; and second and third color-signal channels including a control handle adjustable in two dimensions for adjusting the gain of said second channel to control the intensity of the second color reproduced by the apparatus in response to adjustment in one dimension and for controlling the gain of said third channel to control the intensity of the third color reproduced by the apparatus in response to adjustment in the other dimension, whereby color-balance control for the entire picture composition is facilitated.

References Cited in the file of this patent

UNITED STATES PATENTS

| | | |
|---|---|---|
| 2,389,039 | Goldsmith | Nov. 13, 1945 |
| 2,406,760 | Goldmark | Sept. 3, 1946 |
| 2,566,693 | Cherry | Sept. 4, 1951 |
| 2,627,547 | Bedford | Feb. 3, 1953 |
| 2,648,722 | Bradley | Aug. 11, 1953 |
| 2,660,612 | Wood | Nov. 24, 1953 |